(12) United States Patent
Walker et al.

(10) Patent No.: US 9,558,522 B2
(45) Date of Patent: Jan. 31, 2017

(54) CENTRALIZED LICENSING SYSTEM

(71) Applicant: Avaya Inc., Basking Ridge, NJ (US)

(72) Inventors: William Thomas Walker, Evergreen, CO (US); Chinmoy Gangolli, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 833 days.

(21) Appl. No.: 13/913,900

(22) Filed: Jun. 10, 2013

(65) Prior Publication Data

US 2014/0365383 A1 Dec. 11, 2014

(51) Int. Cl.
*G06F 21/00* (2013.01)
*G06Q 50/18* (2012.01)
*G06Q 10/06* (2012.01)

(52) U.S. Cl.
CPC ............ *G06Q 50/184* (2013.01); *G06Q 10/06* (2013.01)

(58) Field of Classification Search
CPC .............................. G06Q 50/184; G06Q 10/06
See application file for complete search history.

(56) References Cited

U.S. PATENT DOCUMENTS

| 6,169,976 | B1* | 1/2001 | Colosso | G06F 21/10 705/51 |
| 2001/0010045 | A1* | 7/2001 | Stefik | G06F 21/10 705/51 |
| 2009/0037336 | A1* | 2/2009 | Sunata | G06F 21/105 705/59 |
| 2011/0276501 | A1* | 11/2011 | Sako | G06F 21/10 705/310 |
| 2012/0311155 | A1 | 12/2012 | Schmidt et al. | |
| 2012/0311656 | A1* | 12/2012 | Hohlfeld | G06F 21/105 726/1 |
| 2013/0133080 | A1* | 5/2013 | Yuki | G06F 21/10 726/27 |

* cited by examiner

*Primary Examiner* — Mary Cheung
(74) *Attorney, Agent, or Firm* — Sheridan Ross P.C.

(57) ABSTRACT

A request to activate a license file is received by a licensing system. The license file comprises a number of licenses. A license may be any type of license. The license file is assigned a license file identifier. A license extension is assigned to the license file identifier. A request to acquire a portion (or all) of the number of licenses of the license file is received from an entity. The portion (or all) of the number of licenses of the license file is assigned to the entity based on the license extension. The entity can then use the licenses as necessary.

20 Claims, 4 Drawing Sheets

CENTRALIZED LICENSING SYSTEM

TECHNICAL FIELD

The systems and methods relate to licensing systems and in particular to centralized licensing systems.

BACKGROUND

Some licensing systems are designed to have a separate licensing manager for each communication system. If a common licensing manager is used, a communication system can consume all the available licenses. This results in other communication systems not being able to use the same licensing manager.

Having separate licensing managers for each communication system is not a problem if there is only a single communication system. However, in environments where there are multiple/distributed communication systems, having multiple license managers can become cumbersome for administrators. In large systems, the administrator may have a large number of separate licensing managers to administer. What is needed is a centralized system that overcomes the problems associated with the current implementations.

SUMMARY

Systems and methods are provided to solve these and other problems and disadvantages of the prior art. A request to activate a license file is received by a licensing system. The license file comprises a number of licenses. A license may be any type of license. The license file is assigned a license file identifier. A license extension is assigned to the license file identifier. A request to acquire a portion (or all) of the number of licenses of the license file is received from an entity. The portion (or all) of the number of licenses of the license file is assigned to the entity based on the license extension. The entity can then use the licenses as necessary.

DETAILED DESCRIPTION

Figure 1:
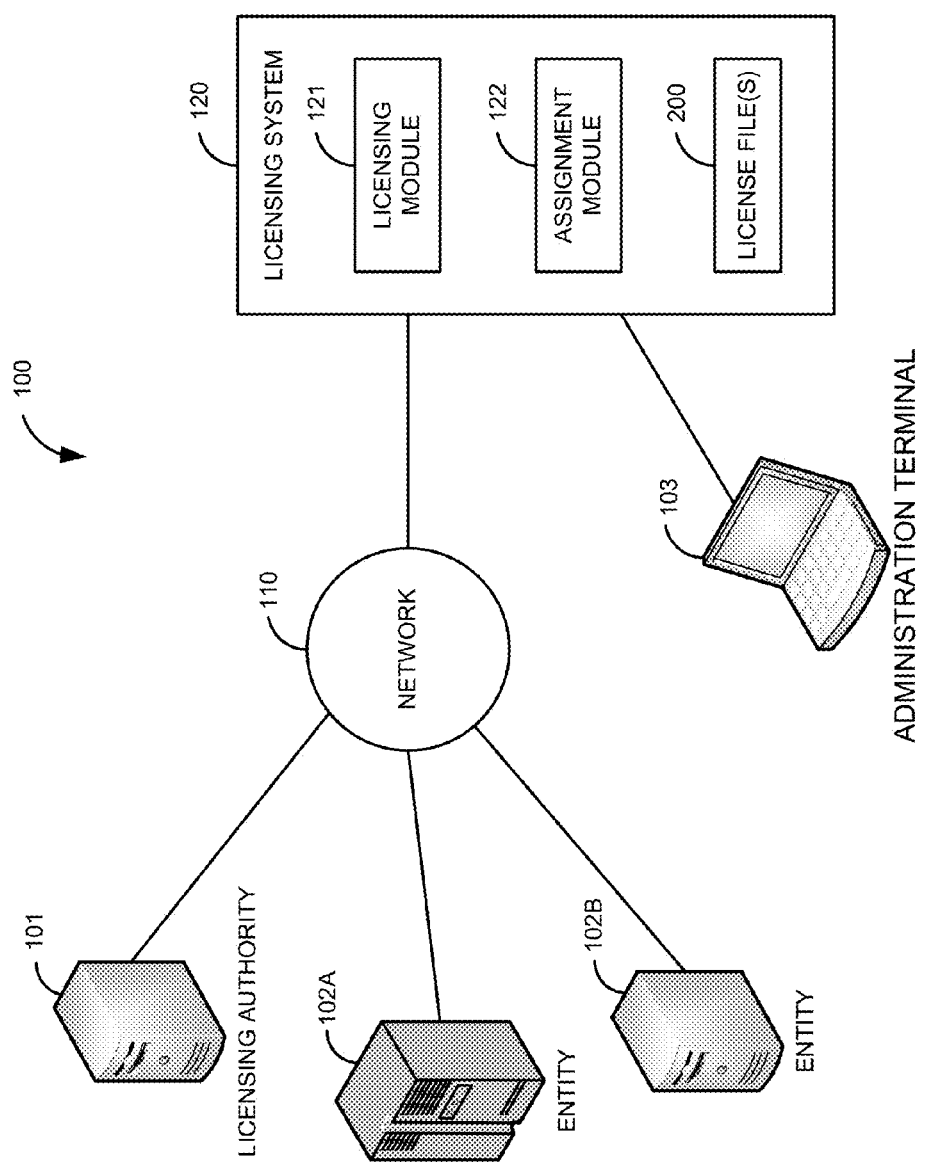
FIG. 1 is a block diagram of a first illustrative system for managing license files.

FIG. 1 is a block diagram of a first illustrative system 100 for managing license files 123. The first illustrative system 100 comprises a licensing authority 101, entities 102A-102B, an administration terminal 103, a network 110, and a licensing system 120.

The licensing authority 101 can be any hardware/software that can provided licensing services, such a trusted authority, a service provider, a corporate licensing authority, a licensing entity, and/or the like. The entities 102A-102B can be any device, system, or user that consumes licenses, such as a Private Branch Exchange (PBX), a communication manager, a personal computer, a central office switch, a tablet device, a smart phone, a gateway, a proxy server, a video server, a streaming service, a server, the licensing system 120 a combination of these, and the like. Although only two entities 102A-102B are shown in FIG. 1, any number of entities 102 may be connected to the network 110, including only a single entity 102. In addition, the entities 102A-102B may be directly connected to the licensing system 120. The entities 102A-102B may both be communication systems or different types of systems. The administration terminal 103 can be any device that may be used to administer licensing system 120, such as a personal computer, a tablet device, a smart phone, a laptop computer, a terminal, and/or the like.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and the like.

The licensing system 120 can be any hardware/software that can manage licenses, such as a server, a communication system, a Private Branch Exchange (PBX), a communication manager, the licensing authority 101, a licensing server, and/or the like. The licensing system 120 further comprises a licensing module 121, an assignment module 122, and license files(s) 200. The licensing module 121 can be any hardware/software that can manage licenses. The assignment module 122 can be any hardware/software that can assign licenses. The license file(s) 200 (further described in FIG. 2) can be any type of file in any format that can be used for licensing. The licensing module 121, the assignment module 122, and the license files 200 are shown as part of licensing system 120. However, in other embodiments, the licensing module 121 the assignment module 122, and the license file(s) 200 may be distributed across the network 110.

The licensing module 121 receives a request to activate a license file 200. The request to activate the license file 200 can be received in various ways. For example, the request to activate a license file 200 can be based on a receipt of the license file 200 from the licensing authority 101. The licensing authority may send the request to activate the license file 200 based on a user purchasing licenses. Alternatively, the request to activate the license file 200 can be based on an administrator installing the license file 200 from the administration terminal 103. In another embodiment, the license file 200 can be activated based on administration input from the administration terminal 103.

Figure 2:
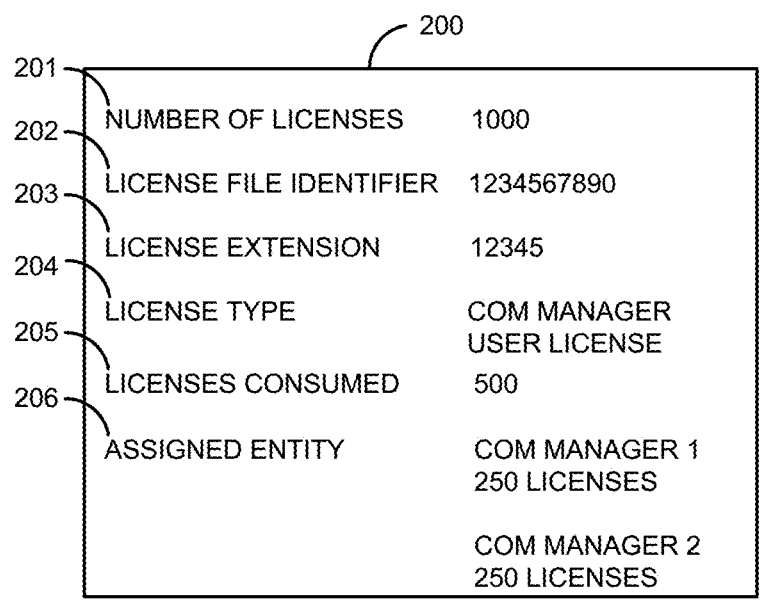
FIG. 2 is a diagram of a license file.

The license file 200 comprises a number of licenses (e.g., the number of licenses 201 in FIG. 2). The number of licenses may be any number of licenses. For example, the number of licenses may only be a single license or a thousand licenses. While a single license type is shown in FIG. 2, a single license file may contain multiple license types, each with its associated license count (e.g. 1000 basic user licenses and 500 advanced user licenses). The assignment module 122 assigns a license file identifier to (e.g., license identifier 202 in FIG. 2) to the license file 200.

The license file identifier can be any identifier that can be used to identify the license file 200. The license file identifier can be any length and may comprise any type of numbers, characters, fields, strings, bytes, longs, words, long words, and/or the like. The license file identifier, in one embodiment, is unique to the licensing system 120. The license file identifier can be generated in a variety of ways. For example, the license file identifier can be generated based on a server identifier, a host identifier, a network address, a Media Access Control (MAC) address, an IP address of the licensing system 120, a random number generator, a hashing algorithm, a combination of these, and the like.

In one embodiment, the licensing system 120 comprises a plurality of licensing systems 120. A host identifier (or a portion of a host identifier) of each licensing system 120 is used to generate a separate license file identifier for each license file 200.

The assignment module 122 assigns a license extension (e.g., license extension 203 in FIG. 2) to the license file identifier. The license extension can be any type of number, characters, strings, numbers, fields, bytes, longs, words, long words, and/or the like. The license extension can be any size or length. However, in one embodiment, the license extension is smaller than the license file identifier. For example, the license file identifier is fifteen characters and the license extension is three characters. The license extension is used for assigning license files 200 to entities 102A-102B. The license extension, in one embodiment, is unique to the licensing system 120.

In one embodiment, the system uses twelve characters of a fifteen character host identifier for the license file identifier. The system generates a three character license extension. The twelve character license file identifier is used with the three character license extension to replace an existing fifteen character license file identifier. The above example uses a specific number of characters for the license file identifier and license extension. However, in other embodiments, the size of these fields may vary.

The licensing module 121 receives a request to acquire a portion (or all) of the number of licenses from the entity 102A. The assignment module 122 assigns the portion (or all) of the number of licenses to the entity 102A based on the license extension. The system can also use the license file identifier along with the license extension to assign the number of licenses to the entity 102A.

In one embodiment, a single license extension is assigned to a single license file 200. The licensing module 121 can receive multiple license files 200. The assignment module 122 assigns a single license file identifier and single license extension to each license file 200. Each entity 102 is assigned all the licenses in a license file 200 based on the license extension. In one embodiment, the license extensions are unique to the licensing system 120.

In another embodiment, a plurality of license extensions can be assigned to a single license file identifier. The plurality of license file extensions may be used by the assignment module 122 to assign a maximum or minimum predetermined number of licenses to an entity 102 based on an individual license extension.

The above description can be repeated for any number of license files 200. To illustrate, consider the following example. The licensing authority 101 sends a first request to activate a first license file 200 to the licensing module 121. The first license file 200 is included in the first request to activate the license file 200. The first license file 200 is for 1000 licenses user licenses for a communication manager. The assignment module 122 assigns a first unique license file identifier 1234567890 to the first license file 200. The assignment module 122 assigns a first license extension 12345 to the first license file identifier 1234567890.

The licensing authority 101 sends a second request to activate a second license file 200 to the licensing module 121. The second license file 200 is included in the second request to activate the second license file 200. The second license file 200 is for 500 user licenses for a communication manager. The assignment module 122 assigns a second unique license file identifier 1234567891 to the first license file 200. The assignment module 122 assigns a second license extension 12346 to the second license file identifier 1234567891.

The entity 102A (a communication manager) sends a first request to license all the number of licenses (1000) of the first license file 200. The licensing module 121 receives the first request. The assignment module 122 assigns all the number of licenses (1000), for the first license file 200 based on the first license extension 12345 to the entity 102A.

The entity 102B (also a communication manager) sends a second request to license all the number of licenses (500) of the second license file 200. The licensing module 121 receives the second request. The assignment module 122 assigns all the number of licenses (500), for the second license file 200 based on the second license extension 12346 to the entity 102B.

In the above example, the assignment of the license file 200 is accomplished based on which entity 102 makes the first request. However, in other embodiments, an administrator using the administration terminal 103 can pre-assign which entity 102 will receive licenses from which license file 200. The administrator may configure the licensing system 120 to only assign a maximum number of licenses to an individual entity 102 based on the license extension. In another embodiment, the license file 200 can contain an identifier which identifies which entity 102 will acquire which license file 200.

FIG. 2 is a diagram of an exemplary license file 200. The license file 200 comprises a number licenses 201, a license file identifier 202, a license extension 203, a license type 204, a number of licenses consumed 205 and an assigned entity(s) 206. However in other embodiments the number of licenses consumed 205 and the assigned entity(s) 206 can be stored separately or in a non-hashed/secured portion of the license file 200.

The number of licenses 201 can be any number of licenses, including zero licenses. The number of licenses may be zero because the number of licenses is upgraded separately or at later point in time (i.e., when the user pays for the licenses). In this example, the number of licenses 201 is 1000. The license file identifier 202, as discussed above, can be any type of identifier. In this example, the license file identifier 202 is a number 1234567890. The license extension 203, as discussed above, can be any type of identifier. The license type 204 can be any type of license type, such as a communication manager license, an operating system license, a license for an application, a user license, a global license, a corporate license, a device license, a combination of these, and the like.

The number of licenses consumed 205 is a number that can change as licenses are assigned to an entity 102. For example, the license file 200 is for 1000 licenses. 500 of the licenses have been assigned to the communication manager 1 (250) and the communication manager 2 (250). The number of consumed licenses 205 may also change when licenses are released or the number of licenses is upgraded. The assigned entity 206 shows which entity 102 currently has assigned licenses and the number of assigned licenses. The assigned entity field 206 may also change as new entities 102 are assigned licenses or release licenses.

The assigning of licenses can be accomplished in various ways. For example, a first license file 200 may have all the licenses assigned to a single entity 102. A second license file 200 may have the licenses assigned in the manner as shown in FIG. 2 where the license file licenses multiple entities 102.

In another embodiment, the first license file 200 may be for a first license type 204 and a second license file 200 may be for a second license type 204. For example, the first license file 200 may be for communication manager user licenses and the second license file 200 may be for operating system licenses on a personal computers.

In another embodiment, the first license file 200 may be for a virtualized instance of a communication system and the second license file 200 may be a license for a non virtualized communication system. As one of skill in the art would recognize, various combinations of the above embodiments described in FIGS. 1 and 2 may be combined and/or intermixed.

In another embodiment, a single entity could be assigned to more than one license file 200 with a precedence order. For example, an entity could be assigned license files A and B, with the priority of using licenses from the license file A first. If license file A runs out of licenses and the entity is requesting additional licenses, the licensing system could then start using licenses from license file B.

Alternatively, common licenses files 200 for "overflow usage" (e.g., first come/first serve) may be used. The "overflow license file 200" is not assigned to any entity 102. If an entity 102 runs out of licenses in its assigned license file 200, it can get licenses (if available) from the overflow license file 200. This in effect a shared pool of licenses above and beyond any assigned licenses.

Figure 3:
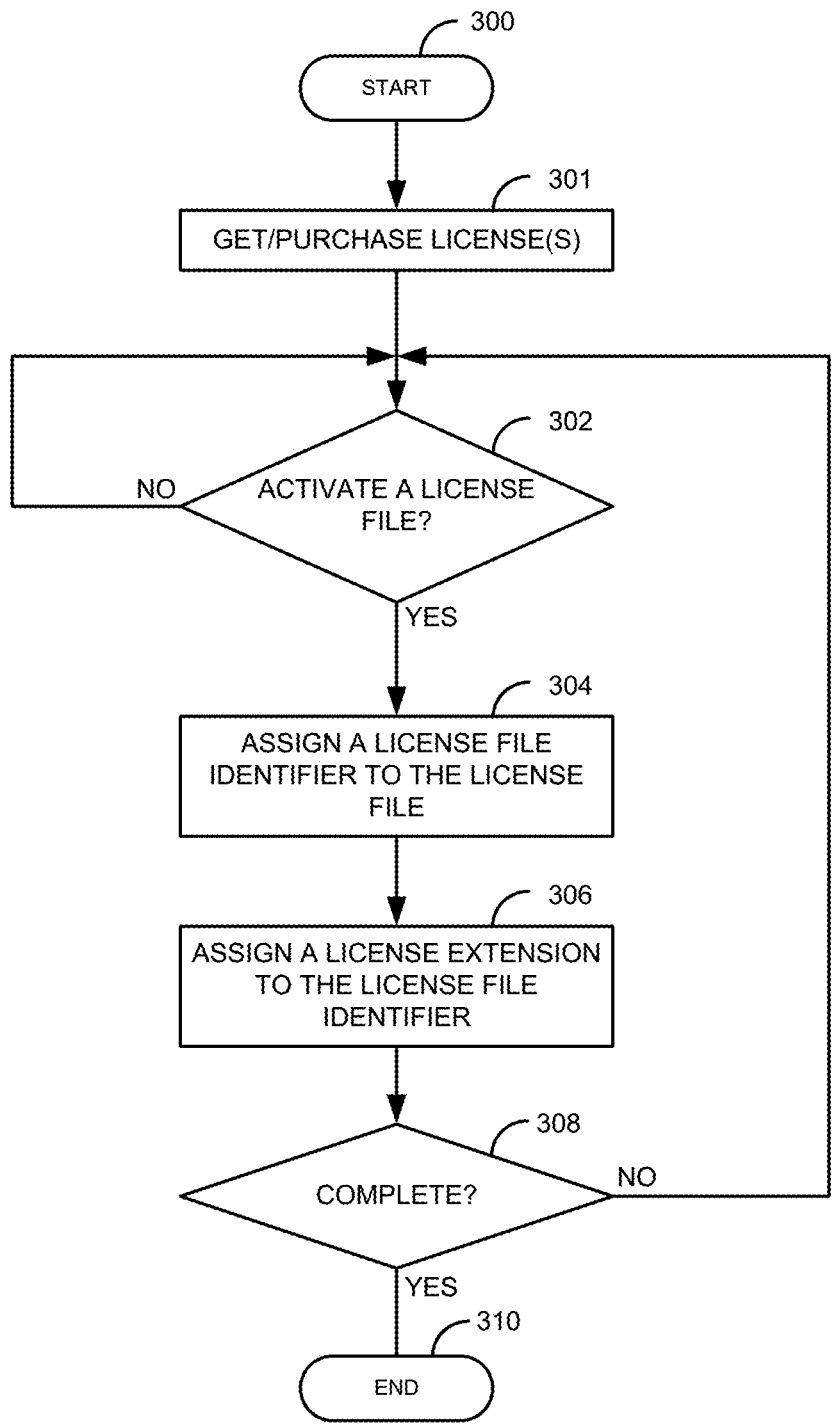
FIG. 3 is a flow diagram of a method for activating license files.
Figure 4:
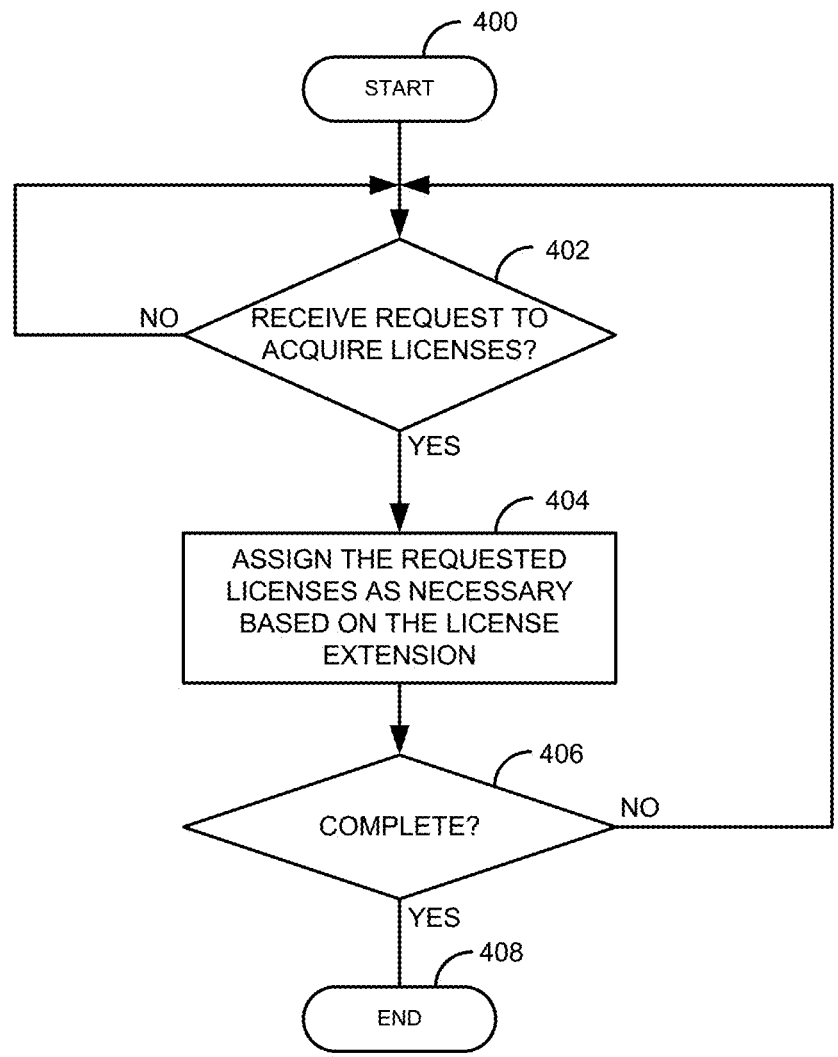
FIG. 4 is a flow diagram of a method for assigning licenses.

FIG. 3 is a flow diagram of a method for activating license files. Illustratively, the licensing authority 101, the entities 102A-102B, the licensing system 120, the licensing module 121, and the assignment module 122 are stored-program-controlled entities, such as a computer or processor, which performs the method of FIGS. 3-4 and the processes described herein by executing program instructions stored in a tangible computer readable storage medium, such as a memory or disk. Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process starts in step 300. The process gets 301 one or more license files. The license files may be purchased from a licensing authority, may come from an administrator installing the license files, and the like. The process determines in step 302 if a request to activate the license file with a number of licenses has been received. The request to activate the license file may be initiated based in the receipt of the license file (i.e., received from the installation disk). If a request to activate the license file has not been received in step 302, the process repeats step 302. Otherwise, if a request to activate the license file has been received in step 302, the process assigns 304 a license file identifier to the license file. The process assigns 306 a license extension to the license file identifier.

The process determines in step 308 if the process is complete. If the process is not complete in step 308, the goes to step 302. Otherwise, if the process is complete in step 308, the process ends in step 310. The process can be complete based on various types of stimulus, such as based on receiving a maximum number of license files, based a maximum number of licenses, based on input from an administrator, and/or the like.

FIG. 4 is a flow diagram of a method for assigning licenses. The process starts in step 400. The process determines in step 402 if a request to acquire licenses has been received. If a request to acquire licenses has not been received in step 402, the process repeats step 402. Otherwise, if the process determines in step 402 that a request to acquire licenses has been received, the process assigns 404 the requested licenses as necessary based on the license extension.

The process determines in step 406 if the process is complete. If the process is not complete in step 406, the process goes to step 402. Otherwise, if the process is complete in step 406, the process ends in step 408.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving, by a microprocessor, in a licensing system, a request to activate a first license file, wherein the first license file comprises a first number of hardware or software licenses and wherein the received request to activate the first license file is received from a licensing authority via a network;
   assigning, by the microprocessor, a first license file identifier to the first license file;
   assigning, by the microprocessor, a first license extension to the first license file identifier;
   receiving, by the microprocessor and via the network, a request to acquire at least a first portion of the first number of hardware or software licenses of the first license file from a first entity, wherein the first entity is a device that consumes the hardware or software licenses; and
   assigning, by the microprocessor, the least a first portion of the first number of hardware or software licenses of the first license file to the first entity based on the first license extension.

2. The method of claim 1, further comprising:
   receiving, by the microprocessor, a request to activate a second license file, wherein the second license file comprises a second number of hardware or software licenses and wherein the received request to activate the second license file is received from the licensing authority via the network;
   assigning, by the microprocessor, a second license file identifier to the second license file, wherein the first license file identifier and the second license file identifier are unique;
   assigning, by the microprocessor, a second license extension to the second license file identifier;
   receiving, by the microprocessor and via the network, a request to acquire at least a first portion of the second number of hardware or software licenses of the second license file from a second entity, wherein the second entity is a device that the consumes hardware or software licenses; and
   assigning, by the microprocessor, the least a first portion of the second number of hardware or software licenses of the second license file to the second entity based on the second license extension.

3. The method of claim 2, further comprising assigning, by the microprocessor, a plurality of license extensions to either the first or second license file.

4. The method of claim 2, wherein the first and second entities are a first and a second communication system that each consume the hardware or software licenses for a plurality of devices.

5. The method of claim 2, further comprising assigning, by the microprocessor, a third entity to at least a second portion of the first number of hardware or software licenses of the first license file, wherein the third entity is a device that consumes the hardware or software licenses.

6. The method of claim 2, wherein the first and second license file identifiers are generated based one of a server identifier, a host identifier, a network address, a Media Access Control (MAC) address, or an IP address of a device.

7. The method of claim 2, wherein the first license file is for a virtualized instance of a communication system and the second license file is for a non-virtualized communication system.

8. The method of claim 2, wherein the first and second license extensions are the same.

9. The method of claim 1, wherein the at least a first portion of the first number of hardware or software licenses of the first license file is all the first number of hardware or software licenses.

10. A licensing system comprising:
a microprocessor; and
a computer readable medium, coupled with the microprocessor and comprising microprocessor readable and executable instructions that program the microprocessor to execute:
a licensing module that receives a request to activate a first license file comprising a first number of hardware or software licenses, wherein the received request to activate the first license file is received from a licensing authority via a network, and receives a request to acquire at least a first portion of the first number of hardware or software licenses of the first license file from a first entity, wherein the first entity is a device that consumes the hardware or software licenses; and
an assignment module that assigns a first license file identifier to the first license file, assigns a first license extension to the first license file identifier, and assigns the least a first portion of the first number of hardware or software licenses of the first license file to the first entity based on the first license extension.

11. The licensing system of claim 10, wherein:
the licensing module receives a request to activate a second license file comprising a second number of hardware or software licenses, and receives a request to acquire at least a first portion of the second number of hardware or software licenses of the second license file from a second entity, wherein the second entity is a device that consumes the hardware or software licenses and wherein the received request to activate the second license file is received from the licensing authority via the network; and
the assignment module assigns a second license file identifier to the second license file, wherein the first license file identifier and the second license file identifier are unique, assigns a second license extension to the second license file identifier, and assigns the least a first portion of the second number of hardware or software licenses of the second license file to the second entity based on the second license extension.

12. The licensing system of claim 11, wherein the assignment module assigns a plurality of license extensions to either the first or second license file.

13. The licensing system of claim 11, wherein the first and second entities are a first and a second communication system that each consume the hardware or software licenses for a plurality of devices.

14. The licensing system of claim 11, wherein the assignment module assigns a third entity to at least a second portion of the number of hardware or software licenses of the first license file, wherein the third entity is a device that consumes the hardware or software licenses.

15. The licensing system of claim 11, wherein the first and second license file identifiers are generated based one of a server identifier, a host identifier, a network address, a Media Access Control (MAC) address, or an IP address of a device.

16. The licensing system of claim 11, wherein the first license file is for a virtualized instance of a communication system and the second license file is for a non-virtualized communication system.

17. The system of claim 11, wherein the first and second license files are for the same hardware or software licenses and wherein the first and second license extensions are unique to the licensing system.

18. The system of claim 11, wherein the licensing module comprises a plurality of licensing modules in a plurality of licensing systems and wherein the first and second license file identifiers are assigned based on a host identifier of a respective licensing system.

19. The system of claim 18, wherein only a portion of the host identifier of the respective licensing system is used for the first and second license file identifiers.

20. The licensing system of claim 10, wherein the at least a first portion of the first number of hardware or software licenses of the first license file is all the first number of hardware or software licenses.

* * * * *